US008295966B2

(12) United States Patent
Choi et al.

(10) Patent No.: US 8,295,966 B2
(45) Date of Patent: Oct. 23, 2012

(54) METHODS AND APPARATUS TO PREDICT ETCH RATE UNIFORMITY FOR QUALIFICATION OF A PLASMA CHAMBER

(75) Inventors: Brian D Choi, San Jose, CA (US); Gunsu Yun, Pohang (KR); Vijayakumar C Venugopal, Berkeley, CA (US)

(73) Assignee: Lam Research Corporation, Fremont, CA (US)

( * ) Notice: Subject to any disclaimer, the term of this patent is extended or adjusted under 35 U.S.C. 154(b) by 295 days.

(21) Appl. No.: 12/826,562

(22) Filed: Jun. 29, 2010

(65) Prior Publication Data

US 2010/0332013 A1 Dec. 30, 2010

Related U.S. Application Data

(63) Continuation-in-part of application No. 12/555,674, filed on Sep. 8, 2009.

(60) Provisional application No. 61/222,102, filed on Jun. 30, 2009, provisional application No. 61/222,024, filed on Jun. 30, 2009.

(51) Int. Cl.
*G06F 19/00* (2006.01)
*H01L 21/00* (2006.01)
*C23C 16/00* (2006.01)

(52) U.S. Cl. ............ 700/110; 700/103; 700/121; 438/9; 118/723 R

(58) Field of Classification Search .................. 700/103, 700/104, 108–111, 121; 118/723 R, 723 CB, 118/723 EB, 723 MP, 723 FI, 723 MW; 438/9
See application file for complete search history.

(56) References Cited

U.S. PATENT DOCUMENTS

| 4,310,880 A | 1/1982 | Gehman |
| 4,443,848 A | 4/1984 | Gehman |
| 5,272,872 A | 12/1993 | Grutter et al. |
| 5,479,340 A | 12/1995 | Fox et al. |
| 5,640,518 A | 6/1997 | Muhich et al. |

(Continued)

FOREIGN PATENT DOCUMENTS

JP 2003-197609 A 7/2003

(Continued)

OTHER PUBLICATIONS

"International Search Report", Issued in PCT Application No. PCT/US2010/042933: Mailing Date: Feb. 18, 2011.

(Continued)

*Primary Examiner* — Sean Shechtman
(74) *Attorney, Agent, or Firm* — IPSG, P.C. Intellectual Property Law

(57) ABSTRACT

A method for predicting etch rate uniformity for qualifying health status of a processing chamber during substrate processing of substrates is provided. The method includes executing a recipe and receiving processing data from a first set of sensors. The method further includes analyzing the processing data utilizing a subsystem health check predictive model to determine calculated data, which includes at least one of etch rate data and uniformity data. The subsystem health check predictive model is constructed by correlating measurement data from a set of film substrates with processing data collected during analogous processing of a set of non-film substrates. The method yet also includes performing a comparison of the calculated data against a set of control limits as defined by the subsystem health check predictive model. The method yet further includes generating a warning if the calculated data is outside of the set of control limits.

19 Claims, 5 Drawing Sheets

U.S. PATENT DOCUMENTS

| | | | |
|---|---|---|---|
| 5,971,591 | A | 10/1999 | Vona et al. |
| 6,192,287 | B1 | 2/2001 | Solomon et al. |
| 6,332,961 | B1 | 12/2001 | Johnson et al. |
| 6,665,576 | B2 | 12/2003 | Hayashi |
| 6,745,096 | B2 | 6/2004 | Yamamoto et al. |
| 6,824,627 | B2 | 11/2004 | Dhindsa et al. |
| 6,879,867 | B2 | 4/2005 | Tanaka et al. |
| 6,895,293 | B2 | 5/2005 | Reiss et al. |
| 6,902,646 | B2 | 6/2005 | Mahoney |
| 6,969,619 | B1 | 11/2005 | Winniczek |
| 7,010,374 | B2 | 3/2006 | Tanaka et al. |
| 7,016,811 | B2 | 3/2006 | Peck et al. |
| 7,058,467 | B2 | 6/2006 | Tanaka et al. |
| 7,062,411 | B2 | 6/2006 | Hopkins et al. |
| 7,082,345 | B2 | 7/2006 | Shanmugasundram et al. |
| 7,107,115 | B2 | 9/2006 | Tanaka et al. |
| 7,113,838 | B2 | 9/2006 | Funk et al. |
| 7,123,980 | B2 | 10/2006 | Funk et al. |
| 7,146,237 | B2 | 12/2006 | Lev-Ami et al. |
| 7,158,848 | B2 | 1/2007 | Tanaka et al. |
| 7,356,580 | B1 | 4/2008 | Huang et al. |
| 7,376,479 | B2 | 5/2008 | Tanaka et al. |
| 7,413,672 | B1 | 8/2008 | Keil et al. |
| 7,477,960 | B2 | 1/2009 | Willis et al. |
| 7,493,185 | B2 | 2/2009 | Cheng et al. |
| 7,565,220 | B2 | 7/2009 | Huang et al. |
| 7,620,511 | B2 | 11/2009 | Shannon et al. |
| 7,647,237 | B2 | 1/2010 | Malave et al. |
| 7,668,615 | B2 | 2/2010 | Goff et al. |
| 7,676,295 | B2 | 3/2010 | Weetman |
| 7,793,162 | B2 | 9/2010 | Mock et al. |
| 7,805,639 | B2 | 9/2010 | Mock et al. |
| 7,829,468 | B2 | 11/2010 | Keil et al. |
| 7,835,814 | B2 | 11/2010 | Mock et al. |
| 7,848,898 | B2 | 12/2010 | Shannon et al. |
| 7,967,995 | B2 | 6/2011 | Funk et al. |
| 8,000,827 | B2 | 8/2011 | Weetman et al. |
| 8,005,562 | B2 | 8/2011 | Baek et al. |
| 2003/0223055 | A1 | 12/2003 | Agarwal et al. |
| 2004/0004708 | A1 | 1/2004 | Willis |
| 2004/0055868 | A1 | 3/2004 | O'Leary et al. |
| 2004/0175880 | A1 | 9/2004 | Tanaka et al. |
| 2005/0055175 | A1 | 3/2005 | Jahns et al. |
| 2005/0084988 | A1 | 4/2005 | Huang et al. |
| 2005/0130125 | A1 | 6/2005 | Zagyansky |
| 2005/0137735 | A1* | 6/2005 | Loy et al. .................. 700/109 |
| 2005/0159911 | A1 | 7/2005 | Funk et al. |
| 2005/0171627 | A1 | 8/2005 | Funk et al. |
| 2006/0049831 | A1 | 3/2006 | Anwar et al. |
| 2006/0144335 | A1 | 7/2006 | Lee et al. |
| 2006/0180570 | A1 | 8/2006 | Mahoney |
| 2007/0110043 | A1 | 5/2007 | Girard |
| 2007/0224915 | A1* | 9/2007 | David et al. .................. 451/5 |
| 2007/0226540 | A1 | 9/2007 | Konieczny |
| 2008/0082579 | A1 | 4/2008 | Huang et al. |
| 2008/0082653 | A1 | 4/2008 | Huang et al. |
| 2008/0243988 | A1 | 10/2008 | Huang et al. |
| 2010/0332014 | A1 | 12/2010 | Albarede et al. |

FOREIGN PATENT DOCUMENTS

| | | |
|---|---|---|
| KR | 10-2005-0030342 A | 3/2005 |
| KR | 10-2008-0006750 A | 1/2008 |
| WO | WO-2004/102642 A2 | 11/2004 |

OTHER PUBLICATIONS

"Written Opinion", Issued in PCT Application No. PCT/US2010/042933; Mailing Date: Feb. 18, 2011.

"Non Final Office Action", U.S. Appl. No. 12/555,674, Mailing Date: Dec. 23, 2011.

"International Search Report", Issued in PCT Application No. PCT/US2010/040456; Mailing Date: Jan. 21, 2011.

"Written Opinion", Issued in PCT Application No. PCT/US2010/040456; Mailing Date: Jan. 21, 2011.

"International Search Report", Issued in PCT Application No. PCT/US2010/040465; Mailing Date: Jan. 17, 2011.

"Written Opinion", Issued in PCT Application No. PCT/US2010/040465; Mailing Date: Jan. 17, 2011.

"International Search Report", Issued in PCT Application No. PCT/US2010/040468; Mailing Date: Jan. 17, 2011.

"Written Opinion", Issued in PCT Application No. PCT/US2010/040468; Mailing Date: Jan. 17, 2011.

"International Preliminary Report on Patentability", PCT Application No. PCT/US2010/042933, Mailing Date: Jan. 12, 2012.

"International Preliminary Report on Patentability", PCT Application No. PCT/US2010/040456, Mailing Date: Jan. 12, 2012.

"international Preliminary Report on Patentability", PCT Application No. PCT/US2010/040465, Mailing Date: Jan. 12, 2012.

"International Preliminary Report on Patentability", PCT Application No. PCT/US2010/040468, Mailing Date: Jan. 12, 2012.

"International Preliminary Report on Patentability", PCT Application No. PCT/US2010/040477, Mailing Date: Jan. 12, 2012.

"International Preliminary Report on Patentability", PCT Application No. PCT/US2010/040478, Mailing Date: Jan. 12, 2012.

"International Search Report", Issued in PCT Application No. PCT/US2010/040478; Mailing Date: Dec. 28, 2010.

"Written Opinion", Issued in PCT Application No. PCT/US2010/040478; Mailing Date: Dec. 28, 2010.

"International Search Report", Issued in PCT Application No. PCT/US2010/040477; Mailing Date: Feb. 8, 2011.

"Wntten Opinion", Issued in PCT Application No. PCT/US2010/040477; Mailing Date: Feb. 8, 2011.

* cited by examiner

METHODS AND APPARATUS TO PREDICT ETCH RATE UNIFORMITY FOR QUALIFICATION OF A PLASMA CHAMBER

CROSS REFERENCE TO RELATED APPLICATIONS

The present invention claims priority under 35 U.S.C. 119(e) to a commonly owned provisionally filed patent application entitled "Methods and Systems for Advance Equipment Control/Advance Process Control for Plasma Processing Tools," U.S. Application No. 61/222,102, filed on Jun. 30, 2009, by inventors Venugopal et al., all of which is incorporated herein by reference.

This continuation-in-part application claims priority under 37 CFR 1.53(b) of and claims the benefit under 35 U.S.C. §120 to a commonly assigned patent application entitled "Arrangement for Identifying Uncontrolled Events at the Process Module Level and Methods Thereof," by Huang et al., application Ser. No. 12/555,674 filed on Sep. 8, 2009, which is related to and claims priority under 35 U.S.C. §119(e) to a commonly assigned provisional patent application entitled "Arrangement for Identifying Uncontrolled Events at the Process Module Level and Methods Thereof," by Huang et al., Application Ser. No. 61/222,024, filed on Jun. 30, 2009, all of which is incorporated by reference herein.

BACKGROUND OF THE INVENTION

Advances in plasma processing have provided for growth in the semiconductor industry. In today's competitive market, the ability to minimize waste and produce high quality semiconductor devices gives the device manufacturer a competitive edge. Accordingly, tight control of the processing environment is generally needed to achieve satisfactory results during substrate processing.

Those skilled in the art are aware that the condition of a processing chamber may affect the quality of the semiconductor devices being produced. Accordingly, the ability to accurately qualify a processing chamber may reduce the cost of ownership of the processing tool and reduce waste. In an example, by accurately qualifying a processing chamber, a recipe may be adjusted to account for the chamber condition. In another example, by accurately qualifying a processing chamber, the processing chamber may be maintained in good working condition, thereby extending the life of the chamber and reducing the potential for waste. As discussed herein, the term "qualify a processing chamber" refers to the process of identifying the condition of a processing chamber and on the steps required to bring the chamber into compliance.

A metrology method may be employed to qualify a processing chamber. With a metrology method, an actual metrology tool may be employed to take measurements such as film thicknesses or critical dimensions (CDs) of a substrate. An example of a commercially available instrument that can make such measurements is an ASET-F5x thin film metrology system from KLA-Tencor Corporation. The measurements may be performed before and after the substrate is processed. After the measurement data have been collected, the etch rates and/or CD bias values for a substrate may be determined. From the spatial map of measured etch rates and/or CD bias values, uniformity may be calculated. As discussed herein, uniformity may be calculated by taking the standard deviation of the etch rates and/or CD bias values.

Although the metrology method may provide an accurate method for qualifying a processing chamber, the metrology method can be an expensive and time-consuming procedure. In an example, the task of measuring the CD bias of just a single substrate may take up to one hour. As a result, most measurements may be taken after a substrate lot has been processed instead of between substrates. For this reason, an entire substrate lot may be damaged before a problem may be identified.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

A virtual metrology method may be employed to qualify a processing chamber. The current virtual metrology method may be based on a predictive model for a specific processing chamber. To construct a predictive model, data collected during processing of a set of film substrates may be correlated against a set of on-wafer measurements such as the spatial maps of etch rates and/or CD bias data that may be calculated based on pre and post-processing measurement data for the same set of film substrates.

Figure 1:
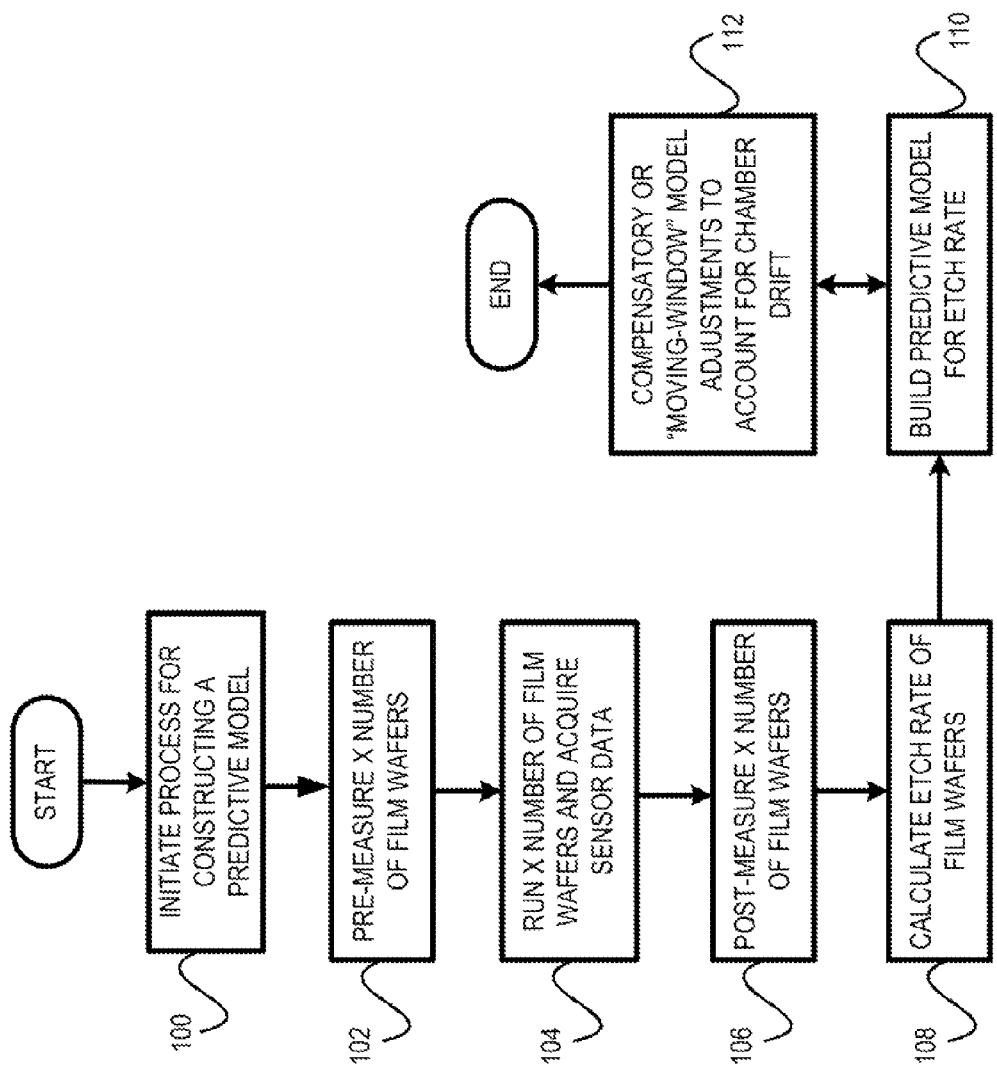
FIG. 1 shows a simple flow chart illustrating a method for constructing a predictive etch rate model for qualifying a processing chamber.

To facilitate discussion, FIG. 1 shows a simple flow chart illustrating a method for constructing a predictive etch rate model for qualifying a processing chamber.

At a first step 100, the process of constructing a predictive model is initiated. The predictive model can begin at any stage during a wet clean cycle.

At a next step 102, pre-processing measurement data is acquired for a set of substrates. In order to construct a predictive model, a set of test substrates is employed. The set of test substrates is usually a set of film substrates or SensArray wafers. Usually, a film substrate is a non-patterned substrate with a film layer. Before processing the set of substrates, pre-processing measurement data for a set of data points on each film substrate is acquired. In an example, the thickness of each film substrate is measured.

At a next step 104, the set of film wafers is processed. Instead of using the actual recipe used to process product wafers, a modified version of the recipe may be employed. The modified recipe may be a simpler version of the production recipe and may exhibit the same etch behavior as the production recipe. During the process, a set of sensors (such as optical emission sensor, pressure measurement sensor, temperature measurement sensor, gas measurement sensor, and the like) is employed to capture processing data.

After substrate processing has ended, at a next step 106, post-processing measurement data is acquired for the processed test substrates.

At a next step 108, the difference between the pre and post-processing measurement data (etch depth) for each data point may be calculated and an average etch rate may be determined for each film substrate.

At a next step 110, a predictive model is constructed. The predictive model may be based on the measured spatial maps of etch rates and the processing data collected by the sensors. In an example, the calculated average etch rates are set as target etch rate values in the predictive model. The processed data is then correlated against the target etch rate values to construct a predictive model. However, even after a predicted model has been constructed, the predictive model may still required constant updates. Updates may occur due to changing conditions of the processing chamber during the course of a scheduled maintenance cycle.

In an example, drift may occur due to changing chamber conditions, deposition on the sensors, and the like. In order to account for the drift, the predictive model may be normalized based on a given set of known drift values. In an example, after a wet clean, the processing chamber may be at an ideal state in which no drift has occurred. However, after a few weeks of substrate processing, the gas distribution subsystem may have experienced a few percent drift. To account for the drift, the predictive model may be adjusted accordingly.

In another example, as part of a wet clean, the chamber wall may have been cleaned and scrubbed and the corroded hardware parts may have been replaced. If the predictive model has been originally constructed when the processing chamber "is not clean," the predictive model may have to be adjusted to account for the "new" chamber condition.

Due to the changing chamber condition, a compensatory or moving window model may be provided (step 112) to update the predictive model. In other words, steps 102-108 may be repeated on a new set of film substrates. The results from the new test run may then be utilized to update the predictive model.

Although a predictive model may be constructed from a virtual metrology method, there are several limitations to the current virtual metrology method.

First, the current virtual metrology method does not provide an accurate method for qualifying a processing chamber since uniformity can not be determined from the predictive model. Even if the predictive model can accurately predict the average etch rate and/or CD bias for a substrate, the number as provided by the predictive model is still only an average number. Those skilled in the art are aware that the actual etch rates and/or CD bias values may vary across the surface of the substrate. For this reason, the average etch rate, for example, may not represent the actual etch rate values across the surface of the substrate. Thus, uniformity can not be determined. As a result, the predictive model may not always accurately qualify the processing chamber.

Another limitation is that very often the robustness of the predictive model is dependent upon the granularity of the processing data being collected by the sensors. Most of the processing tools have sensors that are unable to provide the necessary data granularity that may be required to construct a robust predictive model. Even if the sensors are available to provide the high fidelity data that may be needed to construct the predictive model, most processing tool lacks the capability to perform the analysis. As a result, most predictive models provide errors that are larger than desirable.

In addition to the aforementioned limitations, the expense of constructing and maintaining a predictive model can become quite costly. In an example, a typical predictive model may cost about a few hundred thousand dollars to construct and maintain. The cost is partly due to the expensive film substrates that are being utilized. Even after the predictive model has been constructed, additional cost may be incurred each time the predictive model has to be updated. Additionally, even though less expensive substrates may be available, a device manufacturer may be required to continue using the more expensive film substrate in the production environment if the device manufacturer wants to utilize the predictive model in qualifying a processing chamber.

In accordance with embodiments of the invention, methods are provided for creating a subsystem health check (SSHC) predictive model for qualifying a processing chamber. Embodiments of the invention include methods for constructing an SSHC predictive model that may be applied toward less expensive substrates (such as non-film substrates) which in most cases can be reused a finite number of times. Embodiments of the invention also include methods for qualifying a processing chamber based on uniformity. Embodiments of the invention further include methods for implementing the SSHC predictive model in a production environment.

In this document, various implementations may be discussed using etch rate as an example. This invention, however, is not limited to etch rate and may be applied to other process parameters, such as CD bias, for example. Instead, the discussions are meant as examples and the invention is not limited by the examples presented.

In an embodiment of the invention, a method is provided in which an SSHC predictive model is built utilizing data from at least two different substrate types. In an example, the on-wafer measurements for film substrates may be correlated against data collected during analogous processing of a set of non-film substrates. In an aspect of the invention, the inventors herein realized that measurement data from one type of substrate may be correlated against sensor data from a second type of substrate if a relationship can be established between the two data sets.

In an example, a relationship exists between metrology data for a set of film substrates and sensor data for the same set of film substrates. This relationship is the basis for the predictive model in the prior art. If the same modified recipe is applied to a set of non-film substrates (such as the less expensive bare silicon substrates), a correlation may be established between the two sets of sensor data since the data are being collected in the same processing environment. Through substitution, a correlation may be established between the measurement data of the set of film substrates and the sensor data for the set of non-film substrates. Based on this correlation, an SSHC predictive model for qualifying a processing chamber may be constructed from sensor data collected from non-film substrates.

To further eliminate drift and/or noise in an SSHC predictive model, in an embodiment, data may be collected at different periods within a wet clean cycle. In an example, an SSHC predictive model may be constructed based on data sets collected at the beginning of a wet clean cycle, in the middle of a wet clean cycle, and toward the end of a wet clean cycle. Thus, the SSHC predictive model (unlike the prior art predictive model) does not have to be updated each time the processing chamber undergoes a wet clean since the SSHC predictive model already accounts for such a situation. Additionally, similar data sets between different chambers with the same hardware configurations can be used to ascertain and eliminate chamber-to-chamber variations (such as those brought on by installation and sensor-to-sensor variations).

As previously mentioned, one of the limitations of the predictive model of the prior art is that the predictive model is usually based on data that may lack granularity. In order to provide the required data needed for constructing a robust SSHC predictive model, sensors that are capable of collecting highly granular data may be employed. Examples of sensors include but are not limited to, for example, VI probe sensor, OES sensor, pressure sensor, and the like.

With a higher volume of data at a higher granularity, a robust data analysis module may be employed to process the data and to construct an SSHC predictive model. In an embodiment, the robust data analysis module is a fast processing computing engine that can be configured to handle a large volume of data. In addition, the robust data analysis module may be configured to receive the processing data directly from the sensors instead of having the data being relayed through a fabrication facility host controller or even through a process module controller. Application Ser. No. 12/555,674, filed on Sep. 8, 2009, by Huang et al. describes an example analysis computer suitable for performing the analysis.

In an embodiment, an SSHC predictive model may be employed to predict uniformity. Those skilled in the art are aware that the etch rate may not be uniform across the surface of a substrate. Many factors can impact uniformity. For example, the angle at which gas may be distributed into the processing chamber may affect uniformity. In another example, the power distribution within the processing chamber may affect uniformity.

Figure 4B:
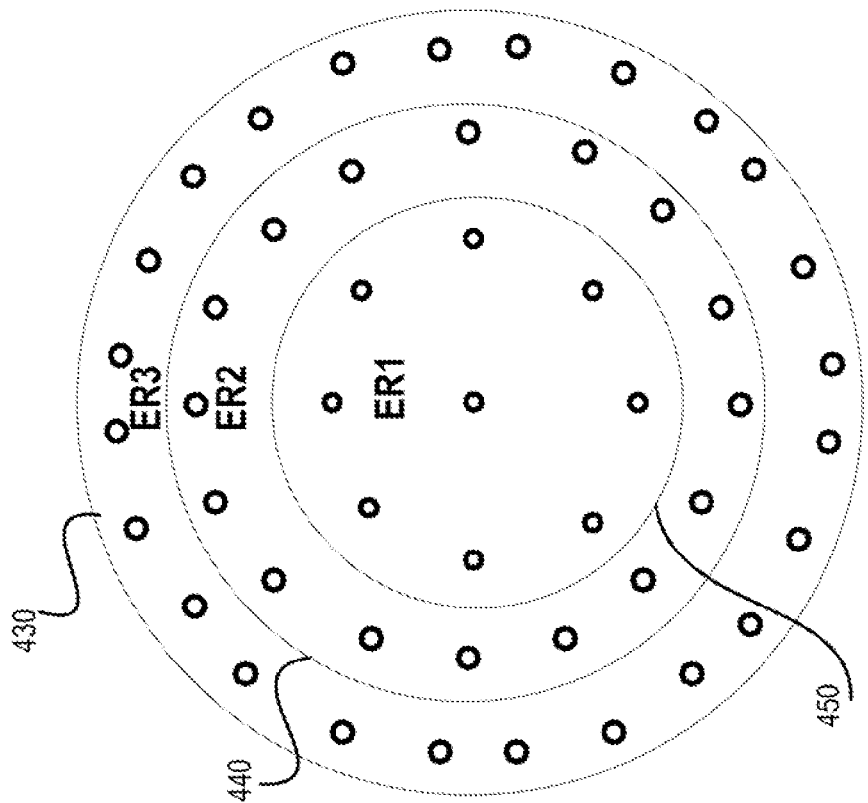
FIG. 4B shows, in an embodiment of the invention, a simple diagram illustrating etch rate uniformity using concentric circles to partition the substrates measurement points.

Even though the etch rate may not be uniform across the surface of a substrate, empirical evidence shows certain area of the substrate may have substantially the same etch rate. In an embodiment of the invention, the substrate may be divided (in an abstract sense) into three concentric circles, and the area within each concentric circle is considered to empirically have the same uniformity. In an embodiment, uniformity may be calculated from the etch rates of the processed substrate. First, the average etch rate for each concentric circle is determined. Then each average etch rate is multiplied by the number of data points measured within the concentric circle (or in the case of the non-film substrates which did not have metrology measurements, they are multiplied by the number of measurement points there was supposed to be ("virtual" points) by a metrology tool (see FIG. 4)). The values for all three concentric circles are added and an average etch rate for the substrate may be calculated. Uniformity is then determined by calculating the standard deviation of each concentric circle average etch rate against the overall average etch rate of the substrate. The overall substrate uniformity is then determined by calculating the standard deviation of all the actual or "virtual" etch depths and computing its percentage with respect to the average etch rate.

Once an SSHC predictive model is constructed, the SSHC predictive model may be migrated into production. Since the SSHC predictive model is constructed partly based on data collected from non-film substrates, the cost of implementing the SSHC predictive model in a production environment is significantly less than the predictive model of the prior art. One reason for the significant cost reduction is that the SSHC predictive model can be applied toward processing data collected from less expensive non-film substrates. In addition, the reduced measurement requirements offer up savings due to fewer metrology tools being required to meet with production needs. The faster turnaround time for qualification of the chamber may also result in fewer at-risk production wafers being processed since problems with the process chamber can be detected faster. Accordingly, the SSHC predictive model provides an effective model for qualifying a processing chamber while effectively reducing ownership cost.

The features and advantages of the present invention may be better understood with referenced to the figures and discussions that follow.

Figure 2:
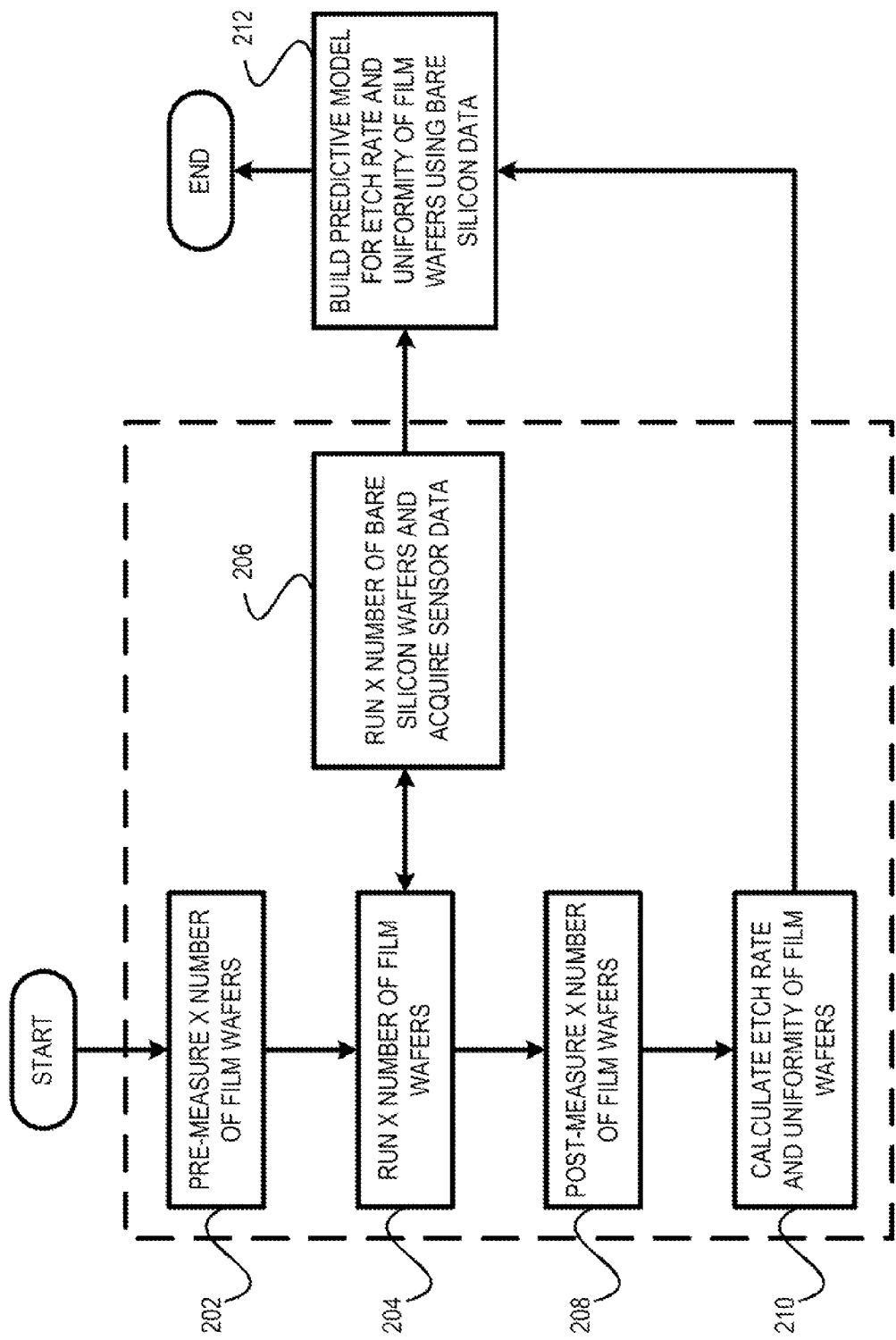
FIG. 2, shows in an embodiment of the invention, a generic overview of a method for constructing a subsystem health check (SSHC) predictive model for qualifying a processing chamber.

FIG. 2, shows in an embodiment of the invention, a generic overview of a method for constructing a subsystem health check (SSHC) predictive model for qualifying a processing chamber.

At a first step 202, pre-processing measurement is performed on a set of film substrates. Similar to the prior art, a metrology tool (such as a KLA-Tencor thin film metrology tool) may be employed to take the measurements, such as measuring thickness of the substrate. Since the thickness of a substrate may vary across the entire substrate, different data points on the substrate (such as the data points shown in the 49 points polar scan of substrate 402 in FIG. 4A) may be measured.

At a next step 204, the set of film substrates are processed. Similar to the prior art, a modified recipe may be employed within the test environment. The modified recipe may be a simpler version of the production recipe and tends to simulate the etch behavior of the production recipe.

Those skilled in the art are aware that a parameter change may influence an average etch rate and/or uniformity of a substrate. Thus, in order to accurately qualify a processing chamber, parameter changes may have to be accounted for in creating an SSHC predictive model. In order to improve the robustness of the model, the system response to potential changes in production is assessed. Recipe parameters may be changed as one or more test substrates are processed. In an example, the first few substrates (three substrates, for example) may be executed with the basic modified recipe. For the fourth and fifth substrates, the pressure value may be changed to account for the pressure level change that may occur in the processing chamber. In another example, the gas flow distribution may be adjusted for the next four substrates so that a larger percentage of total gas flows towards the center of the substrate to offset slightly higher edge etch rate which may occur due to eroded chamber consumables (which are typically found near the edge of the substrates).

After the set of film substrates has been processed, at a next step 206, a set of non-film substrates (such as bare silicon substrates) may be processed using the same modified recipe as applied to the set of film substrates. In an example, if the pressure value was increased for the fourth film substrate, then the same pressure value is applied toward the fourth non-film substrate. While the non-film substrates are being processed, sensors may also be collecting processing data. In an embodiment, the order of processing the set of film substrates and the set of non-film substrates does not limit the invention. In other words, either step 204 or step 206 can occur first.

As previously mentioned in the prior art, one of the limitations of the prior art method is due to the granularity of data being collected. In an embodiment, the methods described in this document are applied in a processing tool that supports sensors (such as VI probe sensor, OES sensor, pressure sensor, and the like) that may be capable of collecting highly granular data. Additionally, a fast processing computing analysis module may be implemented to quickly process and analyze the data. In an embodiment, the fast processing computing analysis module may be an advanced process and equipment control system (APECS). The APECS module may be configured to analyze a plurality of data quickly (in situ) and may be able to provide feedback to the processing module (PM) controller of the processing chamber to enable the PM controller to predict the etch rate and/or uniformity for the next incoming substrate. Application Ser. No. 12/555,674, filed on Sep. 8, 2009, by Huang et al. describes an example analysis computer suitable for performing the analysis.

Figure 4A:
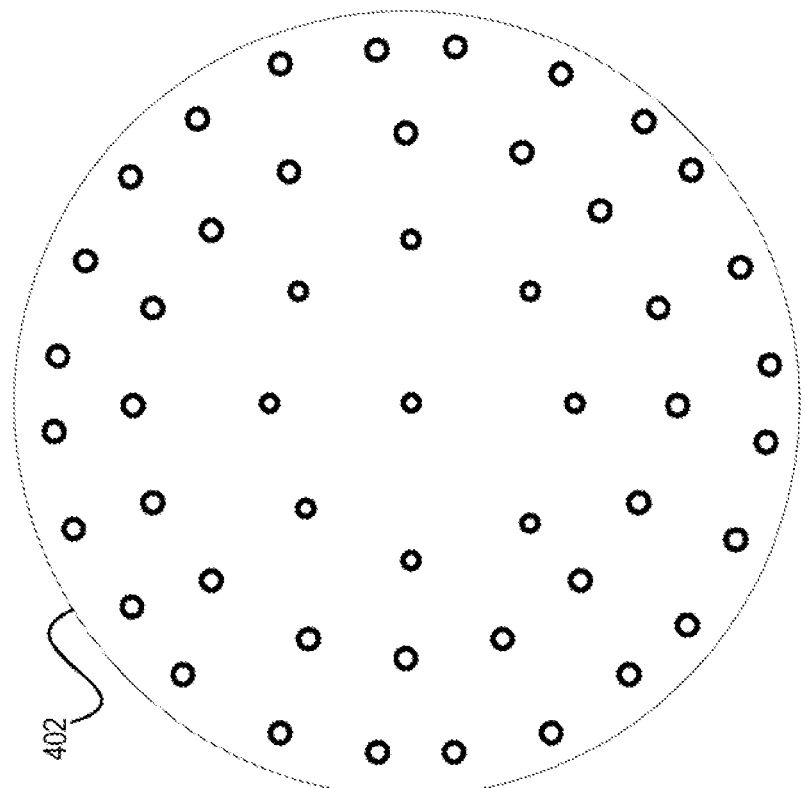
FIG. 4A shows a polar scan of a substrate.

After substrate processing has ended, at a next step 208, post-processing measurement data is acquired. In an example, post-processing measurement data at the same set of data points (as seen in FIG. 4A, for example) may be collected for each processed film substrate.

At a next step 210, the difference between the pre and post-processing measurement data is calculated and an average etch rate and/or uniformity may be calculated for each film substrate. Discussion about uniformity is provided in detail in FIG. 3 and FIG. 4 below.

In one embodiment, to further eliminate noise and/or drift, steps (202-210) for constructing an SSHC predictive model may be performed at least twice. In an embodiment, the steps may be performed at the beginning of a wet clean cycle (i.e., after maintenance has been performed on the processing chamber) and toward the end of a wet clean (i.e., time period before the next maintenance is performed). In addition, data may also be collected during the middle of a wet clean cycle.

Once data has been collected, at a next step 212, the sensor processing data and the metrology data may be correlated and an SSHC predictive model for qualifying a processing chamber may be constructed. In an embodiment, the SSHC predictive model may be based on a partial least squares model. A partial least squares model is a technique for finding relationships between two sets of data. The partial least squares model may have a similar aim to that of least squares linear fitting but is usually used when there are multiple independent variables (in an input matrix X) and possibly multiple dependent variables (in an input matrix Y). In the partial least squares model the Y variables are not continuous but instead consist of a set of independent discrete values or classes. The analysis aims to find linear combinations of the X variables that can be used to classify the input data into one of these discrete classes.

As can be appreciated from FIG. 2, a method is provided for the construction of an SSHC predictive model that may take into account conditions of the processing chamber at different time periods during a wet clean cycle. Even if the SSHC predictive model, as describe in FIG. 2, may require additional time to be constructed (in comparison to the method described in FIG. 1), once constructed, the SSHC predictive model does not have to be constantly updated (as required by the prior art method). Thus, the resources required to construct an SSHC predictive model is usually a one time cost instead of a continual expense (as required by the prior art method). In addition, since the SSHC predictive model may be applied against data collected from non-film substrates, the cost of ownership is significantly reduced since the device manufacturer does not have to continue to utilize the more expensive film substrates within the production environment in order to effectively apply the SSHC predictive model.

Figure 3:
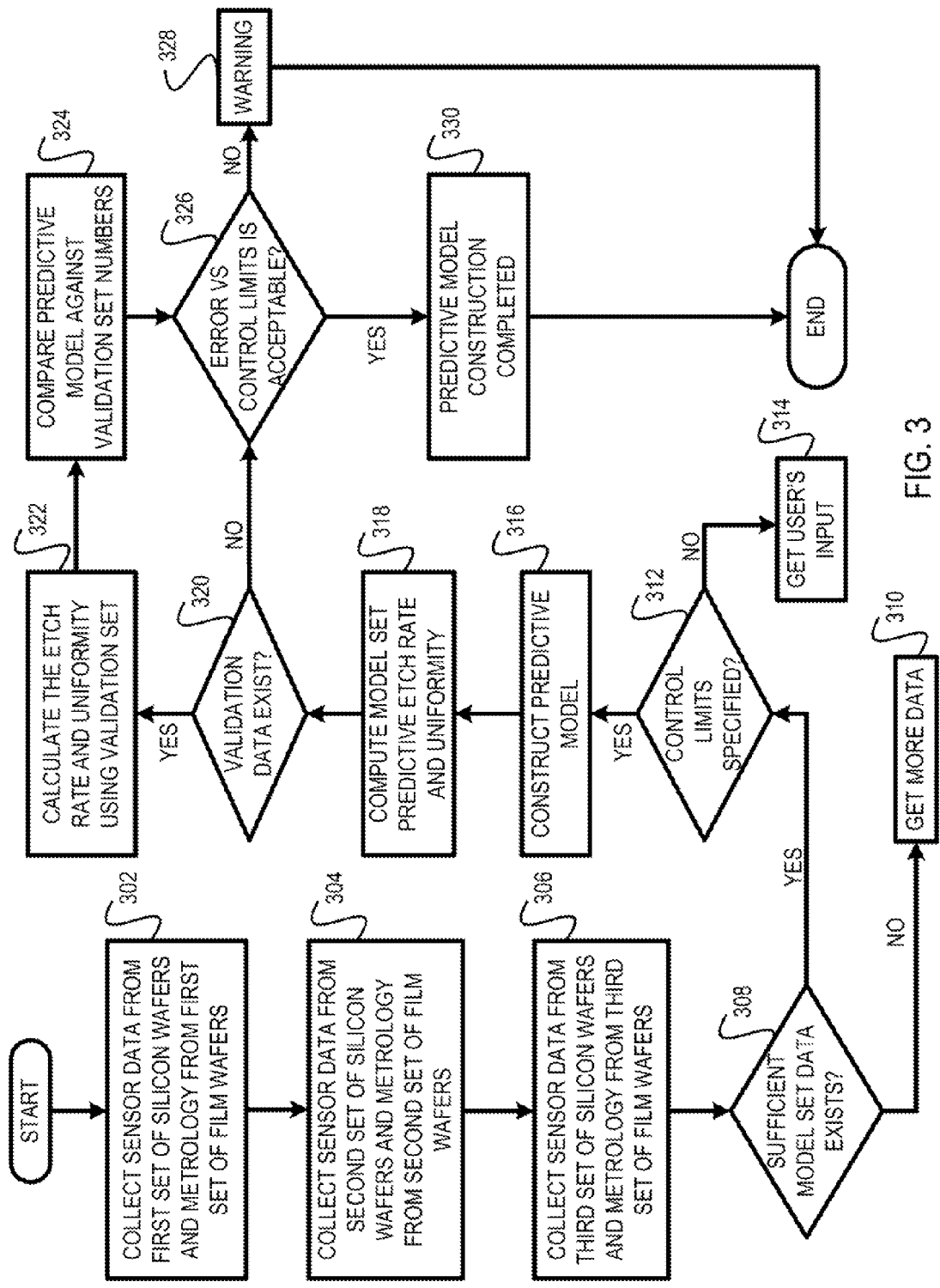
FIG. 3 shows, in an embodiment of the invention, one implementation for constructing an SSHC predictive model.

FIG. 3 shows, in an embodiment of the invention, one implementation for constructing an SSHC predictive model.

At a first step 302, a first set of data is collected. In an embodiment, the first set of data is collected at the beginning of a wet clean cycle (after maintenance has been performed on the processing chamber). The first set of data may include processing data collected by the sensors on a set of non-film substrates and the metrology data collected on a first set of film substrates. In other words, steps 202-210 of FIG. 2 is performed on the set of non-film substrates and the first set of film substrates. In an embodiment, the first set of film substrate and the set of non-film substrates may include the same number of substrates.

At a next step 304, a second set of data is collected. In an embodiment, step 304 is optional. The data collected during step 304 may be employed as validation data. Step 304 is usually performed during the middle of the wet clean cycle in order to account for potential drift that may occur. In an example, some of the hardware components (such as the gas distribution system, for example) may have drifted after several production runs.

Unlike a film substrate, a non-film substrate may be processed multiple times. Those skilled in the art are aware that non-film substrates (such as bare silicon substrates) may be processed up to about 10-15 times at least before the non-film substrates may no longer be able to handle further processing. Thus, the same set of non-film substrates that have previously been etched in step 302 may be processed again in step 304 and later in step 306.

At a next step 306, a third set of data is collected. In an embodiment, the third set of data is collected toward the end of a wet clean cycle. The third set of data includes processing data collected by the sensors on a set of non-film substrates (may be the same set of non-film substrates from step 304) and the metrology data collected on a third set of film substrates.

By collecting data from different time periods during a wet clean cycle, an SSHC predictive model may be able to capture the behavior of a processing chamber through a normal wet clean cycle.

At a next step 308, the system checks to determine if sufficient model set data has been collected. As discussed herein, model set data refers to data collected in steps 302 and 306.

If insufficient model set data exists, then at a next step 310, more data is collected before analysis may begin. Insufficient data may have been collected if not enough film substrates have been processed, for example. In another example, some of the processed data collected by the sensors may be deemed unacceptable and cannot be utilized in constructing the SSHC predictive model.

However, if a sufficient amount of model set data exists, then at a next step 312, the system may check to see if a control limit has been specified. In an embodiment, a control limit is an error range that may be acceptable to the user. Since the SSHC predictive model is being constructed based on highly granular data, the control limit may be set as low as two to three percent.

If the control limit has not yet been set, then at a next step 314, the system may request the control limit to be provided.

However, if the control limit has been specified, then at a next step 316, the system may begin the process of constructing an SSHC predictive model. The SSHC predictive model may include the average etch rates as target etch rates correlated to the sensor processing data.

Target etch rates may be calculated using the model set metrology data. In an example, a substrate location may have a pre-processing measurement of about 500 nm. Once the substrate has been processed, the thickness of the substrate at the same location is now 375 nm. Given that the etch depth is the difference between the pre and post-processing measurements, the etch depth at a given data point (e.g., orientation of 0 degree, radius of 115 mm) is 125 nm. If the process time for the substrate is 2 minutes, then the etch rate is 62.5 nm per minute for that data point (e.g., substrate location). Once the etch rate has been determined, each of the data points on the substrate may now be associated with an etch rate.

Unlike the prior art, the average etch rate of the substrate is not calculated by adding all the etch rate values and dividing the total etch rate value by the number of data points. Instead, the average etch rate of the substrate is based on a concept that the etch rates are not the same across a substrate. Instead, empirical tests have shown that a substrate may be divided (in an abstract manner) into three concentric circles (as shown by concentric circles 450, 440 and 430 of FIG. 4B) with each data point within a concentric circle having similar etch rates.

To facilitate discussion, assume that the average etch rates are 62.5 nm/minute, 72.5 nm/minute and 82.5 nm/minute for concentric circle 450 (ER1), concentric circle 440 (ER2), and concentric circle 430 (ER3), respectively. After the three average etch rates are determined, each average etch rate may be normalized. In an example, concentric circle 450 has nine data points. Accordingly, the average etch rate (62.5 nm/minute) is multiplied by 9. After the average etch rate has been normalized, the overall average etch rate is calculated by combining the three normalized average etch rates and dividing the total by the number of data points (in this example, measurements have been taken at 49 data points). In this example, the overall average etch rate for the substrate is 75.6 nm/minute.

Once the average etch rates have been calculated, uniformity may then be calculated. As aforementioned, the etch rate values of a substrate may be divided into three concentric circles. In other words, the etch rate at a given data point within a concentric circle may be essentially the same. Thus, the substrate is substantially uniform within a concentric circle. Accordingly, the uniformity for a concentric circle may be determined by calculating the standard deviation of the average etch rate for a concentric circle to the overall average etch rate for the substrate.

At a next step 318, the model set predicted etch rates and uniformity may be calculated using the sensor processing data collected. The etch rates and uniformity for the non-film substrates may be predicted using the previously established correlation between sensor data and metrology information (i.e. partial least squares modeling).

At a next step 320, the system checks to determine if validation data has been collected. As aforementioned, validation data may be collected during the optional step 304. If validation data exists, then at a next step 322, the average etch rates and uniformity based on the validation data may be calculated.

At a next step 324, the SSHC model predicted etch rate and uniformity for the validation data set is compared against actual metrology measurements. This step may be utilized to validate the SSHC predictive model.

Once the comparison has been performed, the system may proceed to a next step 326. Similarly, if no validation data exists, the system may proceed to next step 326.

At next step 326, the system may compare the predictive error rate against the control limit. In an example, if the control limit is three percent, then the predictive error rate has to be no larger than three percent.

If the predictive error is not acceptable, then at a next step 328, a warning is issued notifying the user that the SSHC predictive model may have to be adjusted.

However, if the predictive error rate is acceptable, then at a next step 330, the SSHC predictive model may be moved into production and may be made available for qualifying a processing chamber.

Figure 5:
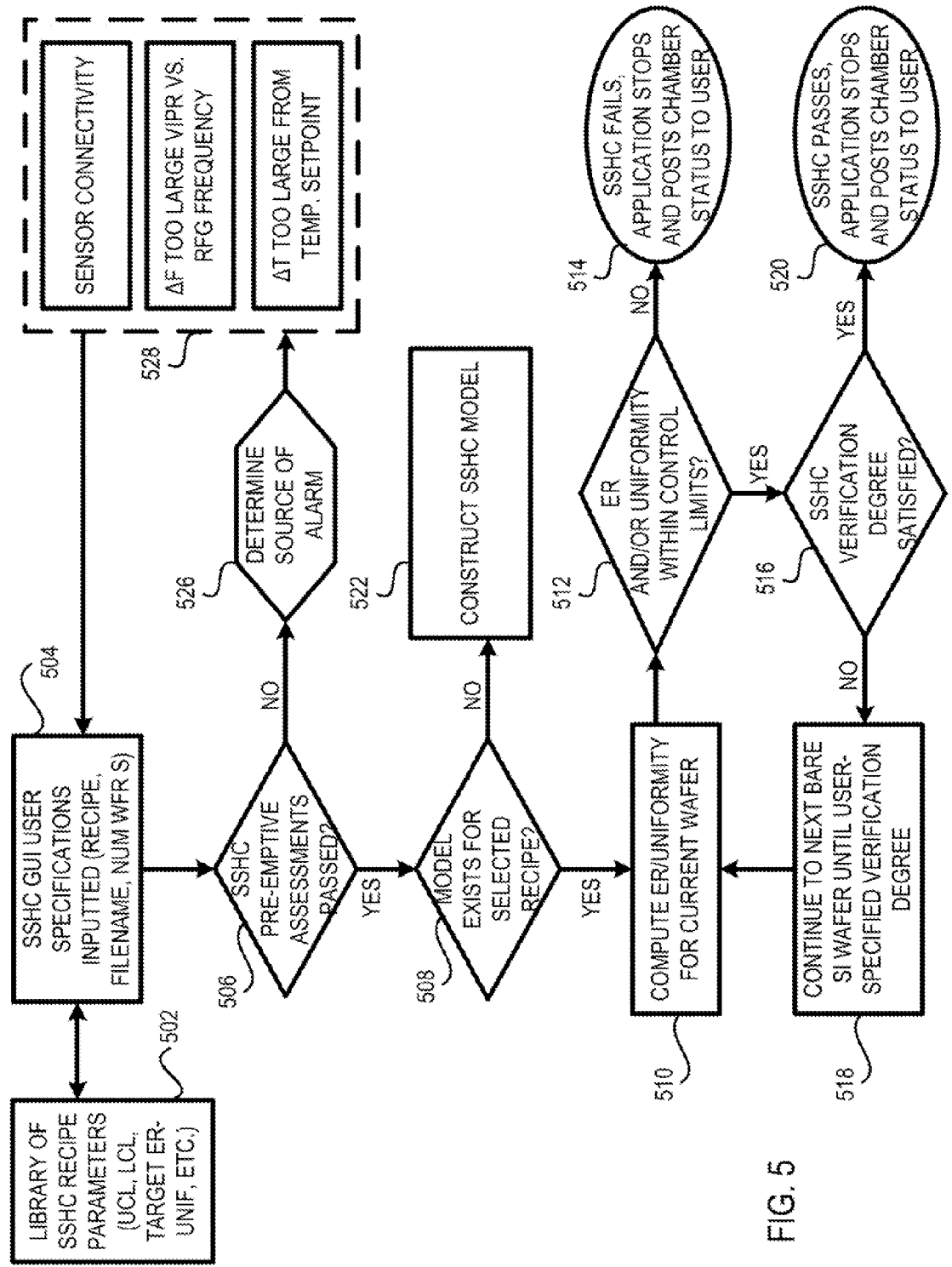
FIG. 5 shows, in an embodiment, a simple flow chart illustrating a method for applying an SSHC predictive model for qualifying a processing chamber.

FIG. 5 shows, in an embodiment, a simple flow chart illustrating a method for applying an SSHC predictive model in qualifying a processing chamber. Before a production run, a subsystem health check test may be executed. In other words, the SSHC predictive model may be applied against data collected from a test substrate to determine the health condition of the processing chamber.

At a first step 504, a user may activate the SSHC predictive model. User specifications (e.g., recipe, filename, and the like) may be entered. This information may also be pulled from a library 502. The library 502 may include recipe specific parameters (such as upper control limit, lower control limit, target etch rate, uniformity, and the like).

At a next step 506, the system may perform a pre-emptive assessment. A pre-emptive assessment may be performed in order to determine the readiness state of the processing chamber.

If the pre-emptive assessment fails (e.g., outside a pre-defined threshold range), at a next step 526, the system may determine the source of the alarm (failure). In an embodiment, the source of alarm may result from connectivity, change in frequency, and/or change in temperature (528).

If the source of alarm is due to connectivity, one or more sensors may not be properly connected. If a sensor is incorrectly connected, the sensor is unable to capture processing data.

Another source of alarm may be due to a large change in frequency. In an example, the frequency as recorded by the electrical probe (such as the VI probe sensor) and the frequency as reported by the generator are compared against one another. If the difference between the two frequencies is above a threshold (e.g., too large), a problem may exist with the VI probe sensor, for example. In an example, the VI probe sensor may be too hot. In another example, the VI probe sensor may have been disabled.

Yet another source of alarm may be due to a large change in temperature between the current temperature within the processing chamber and the desired set point temperature (i.e., recipe temperature). In an example, when the processing tool is first turned on, the temperature within the processing chamber may require a few minutes to reach the desired set point temperature. The system checks to make sure the temperature within the processing chamber is within a desired threshold before processing may begin.

Once the system passes the pre-emptive assessment, then at a next step 508, the system checks to determine if an SSHC predictive model exists.

If an SSHC predictive model does not exist, then at a next step 522, an SSHC predictive model is constructed (as described in FIG. 2 and/or FIG. 3).

However, if an SSHC predictive model exists, then the substrate is processed and processing data is collected. In an embodiment, the SSHC predictive model is applied against processing data to predict the etch rate and/or uniformity (calculated data) for the current substrate (step 510).

At a next step 512, the system checks to determine if the etch rate and uniformity is within the control limit. If the etch rate and/or uniformity is not within the control limit, then at a next step 514, a failure notification may be issued. The failure notice may provide details about the potential problem that may exist within the processing chamber. In an example, the failure notice may indicate that the recipe may have to be adjusted to account for the drift within the processing chamber. In another example, the failure notice may indicate that there was a sudden increase in temperature during substrate processing, which could have been brought on by insufficient coolant to regulate chamber temperature.

However, if the etch rates and uniformity are within the control limits, then at a next step 516, the system may check to determine if an SSHC verification degree is satisfied. In an example, the user may have set a limit indicating that the processing chamber is within good working condition if the etch rates and uniformity for three consecutive substrates are within the control limit.

If the SSHC verification degree has not been met, then at a next step 518, the system may continue to the next substrate (return to step 510). Steps 510 through 518 are iterative. In an embodiment, steps 510 through 518 may be performed until the SSHC verification degree has been satisfied. In another embodiment, inability to satisfy the SSHC verification degree within a predetermined number of substrates may result in a failure notice to the user, thereby, informing the user about a potential problem with the system.

However, if the SSHC verification degree is satisfied, then at a next step 520, the processing chamber has passed the subsystem health check and the production run may begin.

As can be appreciated from the foregoing, methods are provided for qualifying a processing chamber. By extrapolating data from two or more test runs during a wet clean cycle, an SSHC predictive model may be constructed that take into account changes that may occur during a wet clean cycle. With a robust SSHC predictive model, the SSHC predictive model provides an effective model for qualifying a processing chamber while effectively reducing ownership cost.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for predicting etch rate uniformity for qualifying health status of a processing chamber during substrate processing of a set of substrates, comprising:
   executing a recipe on a first substrate of said set of substrates;
   receiving processing data from a first set of sensors during said executing of said recipe;
   analyzing said processing data utilizing a subsystem health check predictive model to determine calculated data, said calculated data including at least one of etch rate data and uniformity data, wherein said subsystem health check predictive model is constructed by correlating a first set of data and a second set of data, said first set of data includes measurement data from a set of film substrates and said second set of data includes processing data collected during analogous processing of a set of non-film substrates;
   performing a comparison of said calculated data of said first substrate against a set of control limits as defined by said subsystem health check predictive model; and
   generating a warning if said calculated data is outside of said set of control limits.

2. The method of claim 1 further including performing a pre-emptive assessment to determine the readiness state of said processing chamber.

3. The method of claim 2 wherein if said pre-emptive assessment is outside a predefined threshold, determining source of problem.

4. The method of claim 1 further including pulling data from a library to support said subsystem health check predictive model.

5. The method of claim 1 wherein said set of control limits is user-configurable.

6. The method of claim 1 further including if said calculated data is within said set of control limits, validating a verification degree to determine if a predefined number of substrates have passed said comparison between said calculated data and said set of control limits.

7. The method of claim 1 wherein said subsystem health check predictive model is constructed from data collected from a time period, wherein said time period being one of at the beginning of a wet cycle, during said wet cycle, and at the end of said wet cycle.

8. The method of claim 7 wherein said subsystem health check predictive model is constructed from data collected from one time period.

9. The method of claim 7 wherein said subsystem health check predictive model is constructed from data collected from at least two time periods.

10. A processing chamber health check arrangement for qualifying a processing chamber of a plasma processing system, comprising:
    a pre-assessment module for determining the readiness of said processing chamber;
    a library for storing at least one of recipes and recipe parameters; and
    a subsystem health check predictive model configured for receiving processing data from a first set of sensors during substrate processing;

analyzing said processing data to determine a set of calculated data, wherein said set of calculated data includes at least one of etch rate data and uniformity data;

comparing said set of calculated data to a set of predefined control limits; and generating warning when said set of calculated data is outside of said set of predefined control limits;

wherein said subsystem health check predictive model is constructed by obtaining a first set of data from a first set of substrates, said first set of substrates being a set of film substrates, wherein said first set of data includes pre-processing measurement data and post-processing measurement data, said post-processing measurement data being collected after executing a recipe on said first set of substrates, collecting a second set of data from a second set of substrates, wherein said second set of data is collected by a set of sensors during execution of an analogous execution of said recipe on a set of non-film substrates, and correlating said first set of data with said second set of data to construct said subsystem health check predictive model.

11. The processing chamber health check arrangement of claim 10 wherein said subsystem health check predictive model further including if said calculated data is within said set of control limits, validating a verification degree to determine if a predefined number of substrates have passed said comparison between said calculated data and said set of control limits.

12. The processing chamber health check arrangement of claim 10 wherein said subsystem health check predictive model is constructed from data collected from a time period, wherein said time period being one of at the beginning of a wet cycle, during said wet cycle, and at the end of said wet cycle.

13. The processing chamber health check arrangement of claim 12 wherein said subsystem health check predictive model is constructed from data collected from one time period.

14. The processing chamber health check arrangement of claim 12 wherein said subsystem health check predictive model is constructed from data collected from at least two time periods.

15. An article of manufacture comprising a non-transitory program storage medium having computer readable code embodied therein, said computer readable code being configured for predicting etch rate uniformity for qualifying health status of a processing chamber during substrate processing of a set of substrates, comprising:

code for executing a recipe on a first substrate of said set of substrates;

code for receiving processing data from a first set of sensors during said executing of said recipe;

code for analyzing said processing data utilizing a subsystem health check predictive model to determine calculated data, said calculated data including at least one of etch rate data and uniformity data, wherein said subsystem health check predictive model is constructed by correlating a first set of data and a second set of data, said first set of data includes measurement data from a set of film substrates and said second set of data includes processing data collected during analogous processing of a set of non-film substrates;

code for comparing said calculated data of said first substrate against a set of control limits as defined by said subsystem health check predictive model; and code for generating a warning if said calculated data is outside of said set of control limits.

16. The article of manufacture of claim 15 further including code for performing a pre-emptive assessment to determine the readiness state of said processing chamber.

17. The article of manufacture of claim 15 further including code for pulling data from a library to support said subsystem health check predictive model.

18. The article of manufacture of claim 15 further including if said calculated data is within said set of control limits, code for validating a verification degree to determine if a predefined number of substrates have passed said comparison between said calculated data and said set of control limits.

19. The article of manufacture of claim 15 wherein said subsystem health check predictive model is constructed from data collected from a time period, wherein said time period being one of at the beginning of a wet cycle, during said wet cycle, and at the end of said wet cycle.

* * * * *